United States Patent
Liang et al.

(10) Patent No.: US 6,570,289 B1
(45) Date of Patent: May 27, 2003

(54) LOW NOISE AUTOMOTIVE ALTERNATOR

(75) Inventors: Feng Liang, Canton, MI (US); Shawn H. Swales, Canton, MI (US); John Miller, Saline, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/678,290

(22) Filed: Oct. 2, 2000

(51) Int. Cl.⁷ .................................................. H02K 1/00
(52) U.S. Cl. ...................................... 310/179; 310/180
(58) Field of Search ................................. 310/179, 198, 310/180, 184, 208; 322/59, 63, 65, 66, 90

(56) References Cited

U.S. PATENT DOCUMENTS

| | | | |
|---|---|---|---|
| 4,144,470 A | * 3/1979 | Auinger | 310/198 |
| 4,338,534 A | * 7/1982 | Broadway et al. | 310/184 |
| 4,528,472 A | * 7/1985 | Auinger | 310/198 |
| 4,609,862 A | * 9/1986 | Becker et al. | 322/90 |
| 5,122,705 A | 6/1992 | Kusase et al. | |
| 5,274,322 A | 12/1993 | Hayashi et al. | |
| 5,449,962 A | 9/1995 | Shichijyo et al. | |
| 5,686,774 A | * 11/1997 | Slavik et al. | 310/198 |
| 5,691,590 A | 11/1997 | Kawai et al. | |
| 5,714,821 A | * 2/1998 | Dittman | 310/179 |
| 5,994,802 A | 11/1999 | Shichijyo et al. | |
| 6,198,190 B1 | * 3/2001 | Umeda et al. | 310/179 |

* cited by examiner

Primary Examiner—Thanh Lam
(74) Attorney, Agent, or Firm—John Kaiander

(57) ABSTRACT

A reduced noise alternator that reduces harmonic magnetic fluxes in the alternator and thus the magnetic noise of the alternator is reduced. In one aspect of the invention, an electrical machine has a stator core with a first and second and third plurality of slots. A first set of three-phase windings has a first winding, second winding, and a third winding. A second set of windings also has a first winding, a second winding and a third winding. A third set of windings also has a first winding, a second winding and a third winding. The first winding of the first set of three-phase windings and the first winding of the second set of three-phase windings and the first winding of the third set of three-phase windings are disposed in the first plurality of slots. The second winding of the first set of three-phase windings and the second winding of the second set of three-phase windings and the second winding of the third set of three-phase windings are disposed in the second plurality of slots. The third winding of the first set of three-phase windings and the third winding of the second set of three-phase windings and the third winding of the third set of three-phase windings are disposed in the third plurality of slots. The three sets of windings are grouped into three wye-connected winding connections, which are electrically coupled to each other.

6 Claims, 9 Drawing Sheets

LOW NOISE AUTOMOTIVE ALTERNATOR

The present invention relates generally to rotating electrical machines, and more particularly, to a stator structure configured to generate a reduced amount of audible noise.

TECHNICAL FIELD

Alternators are rotating electrical machines used in vehicles for generating electric power to charge the battery when the rotator of the alternator is turning at a sufficient speed. Those skilled in the art will recognize that alternators are also referred to as generators. In the design of automotive vehicles, manufacturers are continually trying to reduce the audible noise generated from various components in the vehicle. Alternators generate audible noise due to the magnetic force in the alternator and other factors, such as fan noise.

Referring now to FIG. 1, one proposed method for reducing harmonics is demonstrated in U.S. Pat. No. 5,122,705. The stator winding has one set of Y-connected three-phase windings and one set of delta-connected three-phase windings. The currents in the two three-phase windings have a 30° phase shift. The harmonic flux is generated by the windings cancel each other to some extent to reduce magnetic noise. However, the winding configuration allows fundamental current component circulating in the three loops formed by the six windings; U, X, Z; V, X, Y; and, W, Y, Z. Because the circulating current does not contribute to the output of the alternator, the efficiency of the alternator is reduced. To minimize circulating current, the '705 patent has two significant drawbacks. First, the number of stator slots is doubled compared to existing alternators. Secondly, the selection of number of turns is limited.

To prevent circulating current from occurring, the line-to-line voltages of the Y-connected windings have to be identical to the phase voltages of the Delta-connected windings. That is, the line-to-line voltage $V_{xy}$ of the Y-connected windings has to have the same magnitude and phase angle as those of the phase voltage $V_v$ of the Delta-connected windings. Since the line-to-line voltage $V_{xy}$ has a 30° phase shift with respect to the phase voltage $V_x$, the voltage $V_v$, has to have a 30° phase shift with respect to $V_x$ in order for $V_v$ to have the same phase angle with that of $V_{xy}$. In order for $V_v$ to have a 30° phase shift with respect to the $V_x$ the winding V must be placed in the stator with a 30° electrical angle displacement in space with respect to the winding X. However, the minimum displacement between two coils in existing alternators is 60°, which is the angle between two adjacent stator slots. Therefore, the number of stator slots has to be doubled in order for the wye-connected windings to have a 30° displacement with regard to the delta-connected windings. The high number of stator slots makes the teeth very narrow and subject to deformation during the winding manufacturing or the stator core assembly. Also, the high number of stator slots makes the winding manufacturing complicated and therefore increases the alternator cost.

With respect to the second drawback related to the number of turns, in order for $V_v$ to have the same magnitude as that of $V_{xy}$, which equals $3V_x$, the number of turns of winding $V(N_v)$ should be 3 times the number of turns of the winding X ($N_x$). Since the number of turns must be an integer, it is impossible to exactly satisfy the condition $N_v=3 N_x$, which is a necessary condition to eliminate the circulating current. Therefore, the configuration proposed in the '705 patent cannot be made to eliminate circulating current.

U.S. Pat. No. 5,449,962 illustrated in FIG. 2 has a different winding configuration from that shown in FIG. 1. This embodiment is believed to have the second drawback described above. That is, there is little flexibility in the selection of the number of turns of the stator winding.

Therefore, it would be desirable to provide an alternator stator configuration that reduces magnetic noise and thus, audible noise without increasing the number of stator slots and without having new constraints on the selection of the number of turns.

SUMMARY OF THE INVENTION

The present invention provides a reduced noise alternator that reduces magnetic harmonic fluxes in the alternator and thus the magnetic noise of the alternator is reduced. In one aspect of the invention, an electrical machine has a stator core with a first and second and third plurality of slots. A first set of three-phase windings has a first winding, second winding, and a third winding. A second set of windings also has a first winding, a second winding and a third winding. A third set of windings also has a first winding, a second winding and a third winding. The first winding of the first set of three-phase windings and the first winding of the second set of three-phase windings and the first winding of the third set of three-phase windings are disposed in the first plurality of slots. The second winding of the first set of three-phase windings and the second winding of the second set of three-phase windings and the second winding of the third set of three-phase windings are disposed in the second plurality of slots. The third winding of the first set of three-phase windings and the third winding of the second set of three-phase windings and the third winding of the third set of three-phase windings are disposed in the third plurality of slots. The first, second, and third set of windings are grouped into a first wye, a second wye and a third wye, said first wye electrically coupled to said second wye and said third wye, said second wye electrically coupled to said third wye.

In another aspect of the invention, three sets of three-phase windings are coupled together. Each of the groupings has three separate and distinct windings. A first grouping is formed from the three sets of three-phase windings in an wye-formation. A second grouping is formed in a second wye-formation and third grouping is formed in a third wye-formation. Each of the groupings having a respective first common node, second common node and third common node there-between. One winding of the first grouping connected to one winding of the second grouping and a second winding of the first grouping connected to one winding of the third grouping. One winding of the second grouping is connected to one winding of the first grouping and one winding of the third grouping. One winding of the third grouping is connected to one winding of the first grouping and one winding of the second grouping.

One advantage of the invention is that a conventional stator core having 36 slots with 12 poles that are commonly used in current alternators may be employed. The stator cores have known characteristics and are unlikely to deform because more slots are not required.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
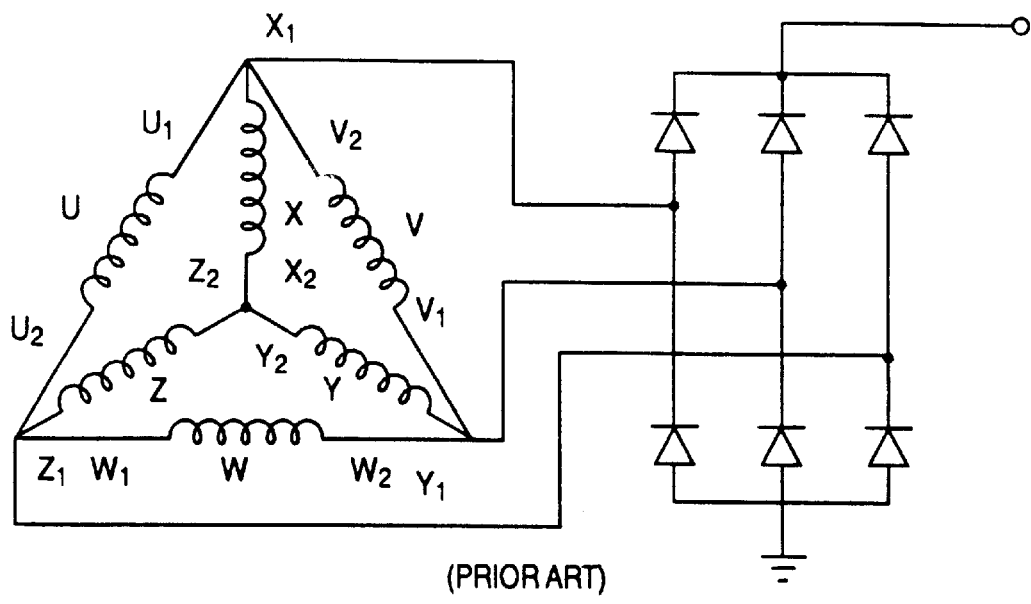
FIG. 1 is schematic view of a stator circuit according to the prior art.

In the following figures, the same reference numerals will be used to identity the same components in the various views. Although one embodiment of an alternator is illustrated, the stator winding circuit embodiments described below may be used in a variety of types of alternators including liquid-cooled alternators, air-cooled alternators and various configurations of alternators including multiple rotor alternators and the like.

Figure 3:
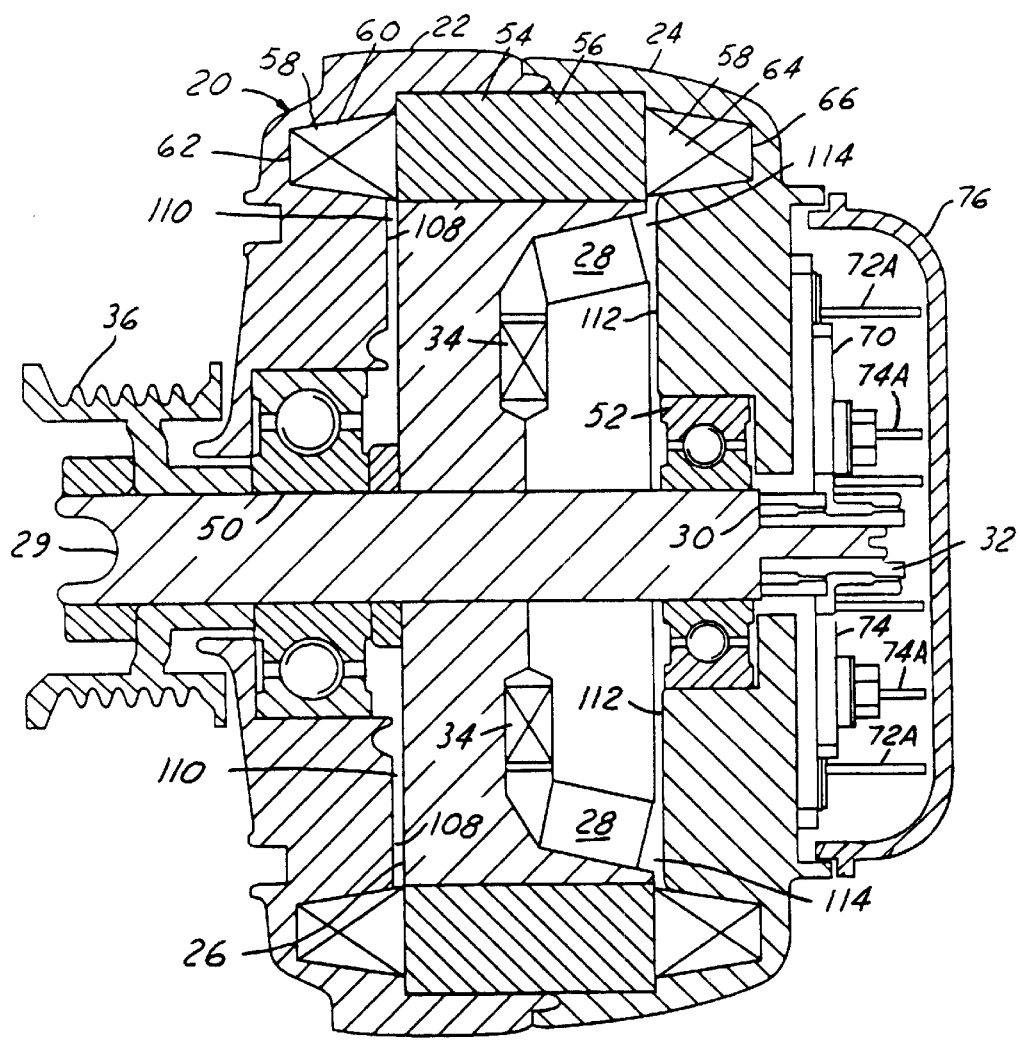
FIG. 3 is a cross-sectional view of an electrical machine incorporating the present invention.

Referring now to FIG. 3, an alternator 20 includes a front housing portion 22 and a rear housing portion 24 which are suitably bolted or otherwise attached together. Front housing portion 22 and rear housing portion 24 are preferably metallic. The housing portions 22 and 24 may be configured with openings for air cooling or fluid passages for liquid cooling as is known to those skilled in the art. Included within front housing portion 22 and rear housing portion 24 is a rotor 26. Those skilled in the art will recognize rotor 26 as being generally of the "claw-pole" variety. A plurality of permanent magnets 28 maybe disposed within rotor 26 in order to enhance the electrical output of alternator 20.

Rotor 26 includes a shaft 29 having two slip rings 30 and 32 which are means for providing electrical power from a voltage regulator (not shown in the particular sectioning employed in FIG. 3) to a field coil 34 disposed within rotor 26. Also coupled to shaft 29 is a pulley 36, or other means for rotating rotor 26. Shaft 29 is rotatably supported by a front bearing 50, itself supported by front housing portion 22, and a rear bearing 52, rotatably supported by rear housing portion 24.

A stator 54 is disposed in opposition to rotor 26. Stator 54 includes a ferromagnetic stator core 56, on which stator windings 58 are wound.

A rectifier 70, coupled to stator windings 58 in order to rectify the alternating current output generated in stator windings 58 by the operation of alternator 20, is mounted to rear housing 24. Rectifier 70 includes a negative rectifier plate 72, which forms the common connection for the cathodes of the "negative" diodes 72A. Rectifier 70 also includes a positive rectifier plate 74, which forms the common connection for the anodes of the "positive" diodes 74A. Negative rectifier plate 72 and positive rectifier plate 74 are electrically insulated from one another. A plastic cover 76 covers the rear of alternator 20, including rectifier 70. Electrical connectors 77 and 78 provide the required electrical connections to and from alternator 20. As those connections are conventional, they are not described in detail here.

Figure 4:
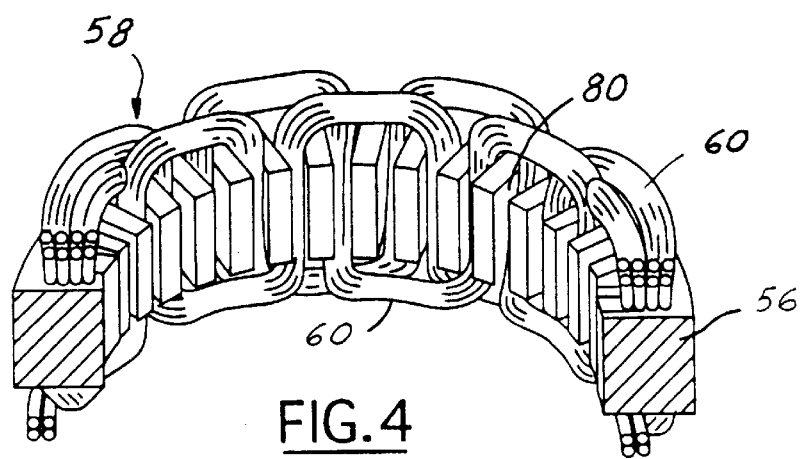
FIG. 4 is a partial cut-away perspective view of a stator core according to the present invention.

Referring now to FIG. 4, a partial cutaway perspective view of a stator 54 is illustrated. Windings 58 with end turns 60 extending therefrom are positioned within slots 80 of stator core 56 in a conventional manner. In this invention, preferably 36 slots 80 are used. This is a conventional number and therefore winding machines are already configured to perform such operations. Also, the portion of the core between the slots maintains a sufficient rigidity to reduce vibrations in contrast to the prior art described above having a greater number of slots.

Figure 5:
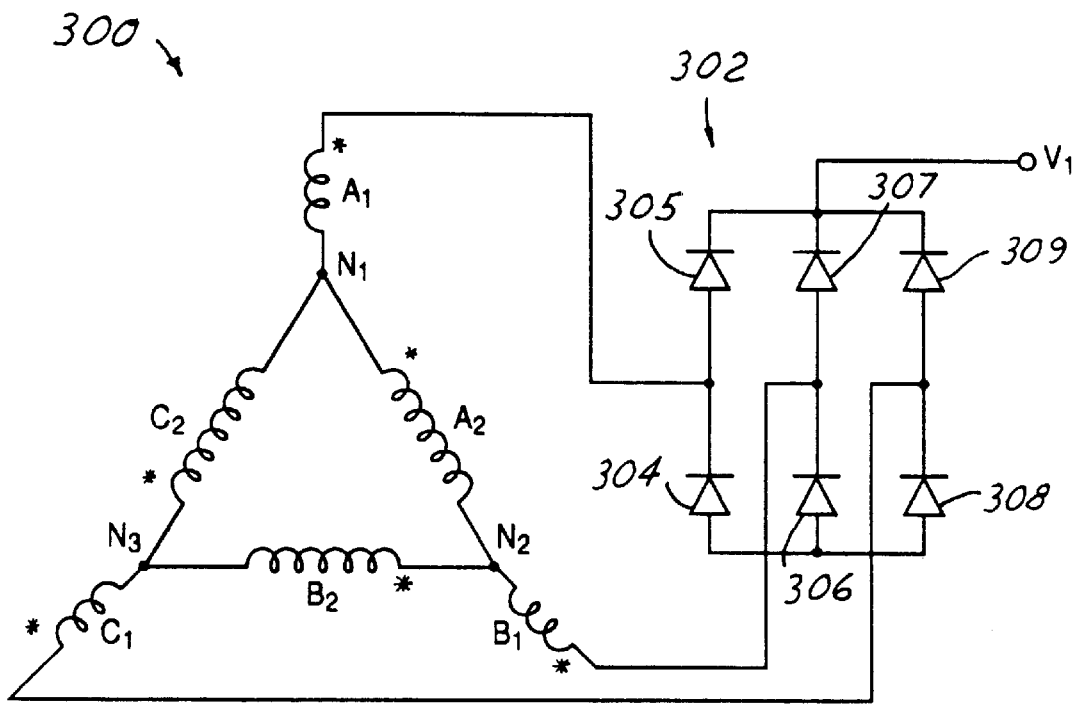
FIG. 5 is a schematic view of a winding circuit according to the present invention.
Figure 2:
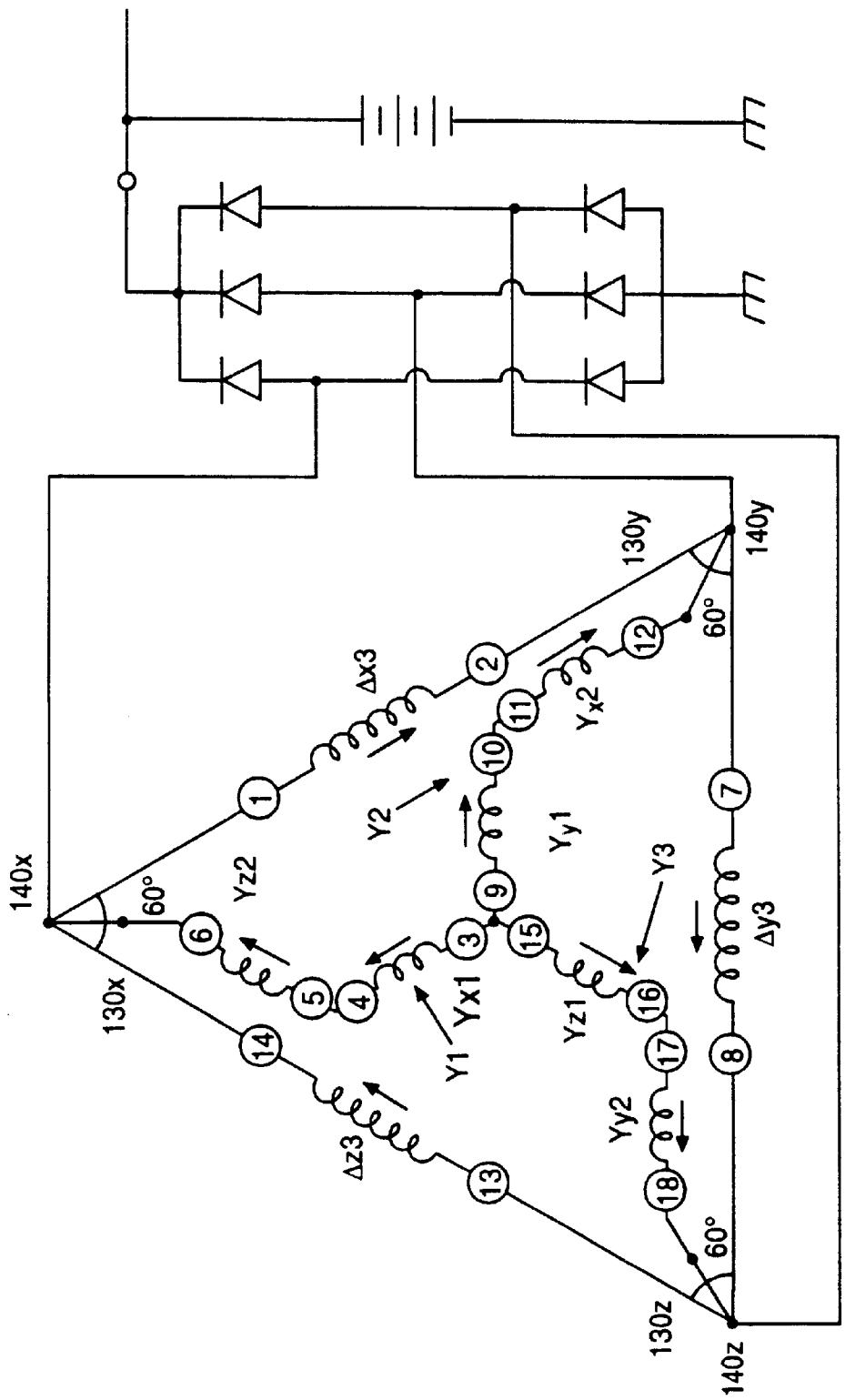
FIG. 2 is a second schematic view of a stator circuit of the prior art.

Referring now to FIG. 5, a schematic view of a stator circuit 300 is coupled to a rectifier circuit 302. Rectifier circuit 302 is a common rectifier circuit as it would be evident to those skilled in the art. Rectifier circuit has six diodes 304, 305, 306, 307, 308, and 309. Each diode has an anode and a cathode. The cathodes of diodes 305, 307, and 309 are coupled together. The anodes of cathodes 304, 306, and 308 are coupled together. The cathode of diode 304 is coupled to the anode of diode 305. The cathode of diode 306 is coupled to the anode of diode 307. The cathode of diode 308 is coupled to the anode of diode 309. The node between diodes 304 and 305, 306 and 307, and 308 and 309 receive one leg of the three-phase output of the schematic circuit in each of the following embodiments. However, for simplicity the rectifier circuit 302 is not illustrated in the following embodiments.

Winding circuit 300 is comprised of two sets of three-phase windings. The first set of three-phase windings has windings $A_1$, $B_1$, and $C_1$. The second set of three-phase windings has windings $A_2$, $B_2$, and $C_2$. The positive polarity end of the three-phase windings is indicated by an asterisk. In this embodiment, the second set of windings $A_2$, $B_2$ and $C_2$ form a delta connection while the other three windings $A_1$, $B_1$, and $C_1$ connect the delta winding to the diode rectifier. It can also be said that three wye-shaped groups of windings are formed. That is, in the first group winding $A_2$, winding $C_2$, and winding $A_1$ are coupled together at a common node $N_1$. The second group has winding $A_2$ coupled to winding $B_1$ and $B_2$ at a common node $N_2$. In the third group, winding $B_2$ is coupled to windings $C_1$ and $B_2$ at a common node $N_3$. Winding $A_2$ has a positive polarity at node $N_1$. Winding $B_2$ has its positive polarity toward $N_2$. Winding $C_2$ has its positive plurality toward node $N_3$.

With respect to the rectifier circuit, winding $A_1$ is coupled to the node between diodes 305 and 304. Winding $B_1$ is coupled to the node between windings 306 and 307. Winding $C_1$ is coupled to the node between diodes 308 and 309. The polarity of each of the first set of windings is away from the delta and toward the rectifier circuit 302.

There is no loop for the fundamental current to circulate in winding circuit 300. Therefore, winding circuit 300 does not have any fundamental circulating current.

Figure 6:
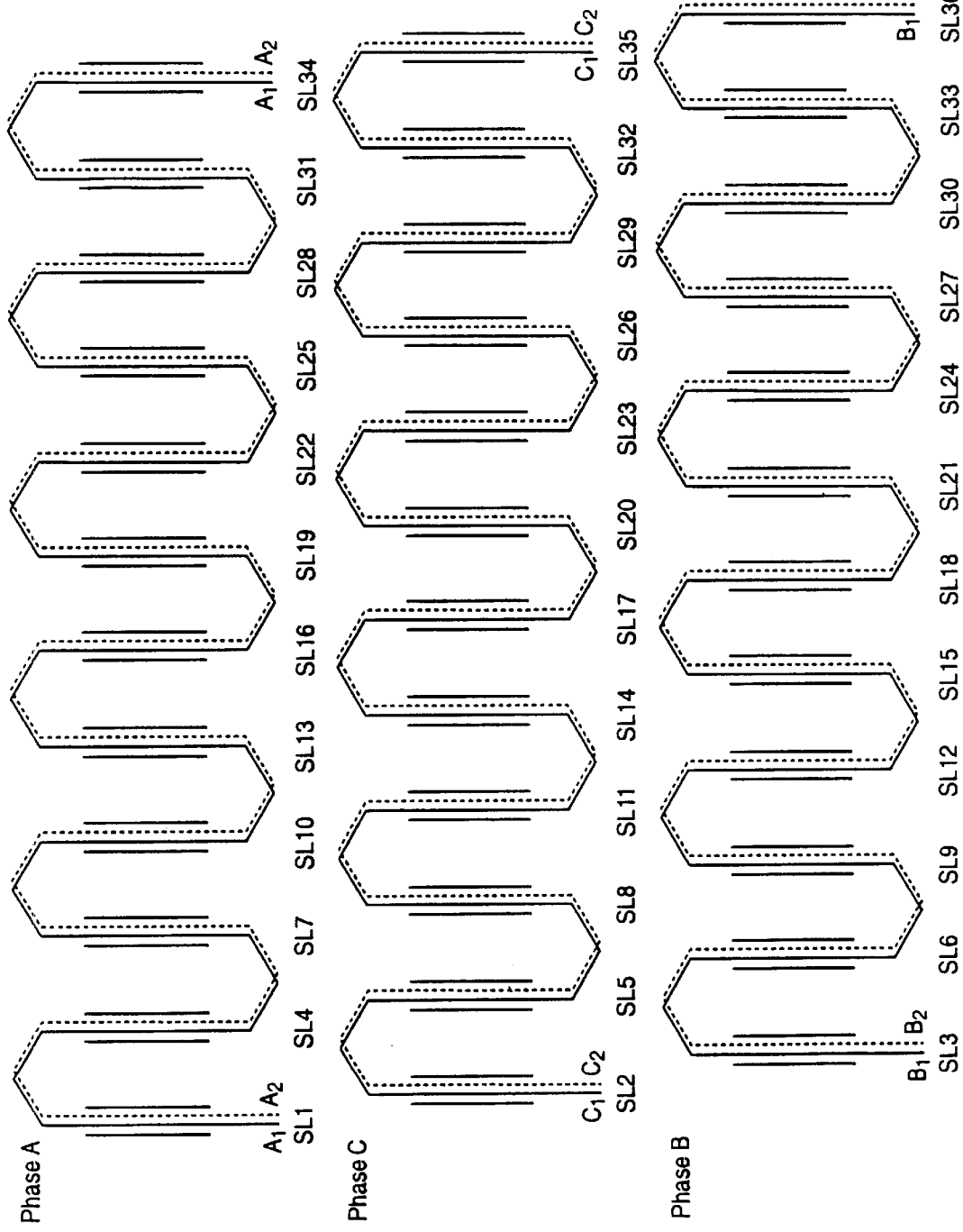
FIG. 6 is a winding diagram of the schematic configuration of FIG. 5.

Referring now to FIG. 6, a winding diagram is illustrated for the circuit FIG. 5. The winding diagram illustrates the slots $SL_1$ through $SL_{36}$ of the stator core. Phase A of the stator core has windings $A_1$ and $A_2$ therein. Windings $A_1$ and $A_2$ are wound in the same plurality of slots consisting of slots $SL_1$, $SL_4$, $SL_7$, $SL_{10}$, $SL_{13}$, $SL_{16}$, $SL_{19}$, $SL_{22}$, $SL_{25}$, $SL_{28}$, $SL_{31}$, and $SL_{34}$. Phase C of the stator core has windings $C_1$ and $C_2$ disposed therein. Phase B has windings $B_1$ and $B_2$ therein. Phase B consists of slots $SL_3$, $SL_6$, $SL_9$, $SL_{12}$, $SL_{15}$, $SL_{18}$, $SL_{21}$, $SL_{24}$, $SL_{27}$, $SL_{30}$, $SL_{33}$, and $SL_{36}$. Phase C consists of slots $SL_2$, $SL_5$, $SL_8$, $SL_{11}$, $SL_{14}$, $SL_{17}$, $SL_{20}$, $SL_{23}$, $SL_{26}$, $SL_{29}$, $SL_{32}$, and $SL_{35}$.

As illustrated, windings $A_1$ and $A_2$ have the positive plurality adjacent to slot $SL_1$. Windings $C_1$ and $C_2$ have positive plurality outside slot 35. Windings $B_1$ and $B_2$ have positive plurality outside slot 3.

Windings $A_1$ and $A_2$ preferably have a different number of turns. For example, the number of turns of winding $A_2$ is preferred to be close to $\sqrt{3}$ times of the number of turns of winding $A_1$. Windings $B_1$ and $C_1$ have the same number of turns as that of winding $A_1$. Windings $B_2$ and $C_2$ have the same number of turns as that of winding $A_2$. Because the currents in the windings $A_1$, $B_1$ and $C_1$ have a 30° phase shift with respect to the currents in windings $A_2$, $B_2$ and $C_2$ the harmonic fluxes generated by the currents cancel each other to some extent. Therefore, the first embodiment of these stator winding will have lower magnetic noise compared with the existing alternators while using the same number of slots commonly used in alternators as well as having the desired number of turns for the particular configuration.

Figure 7:
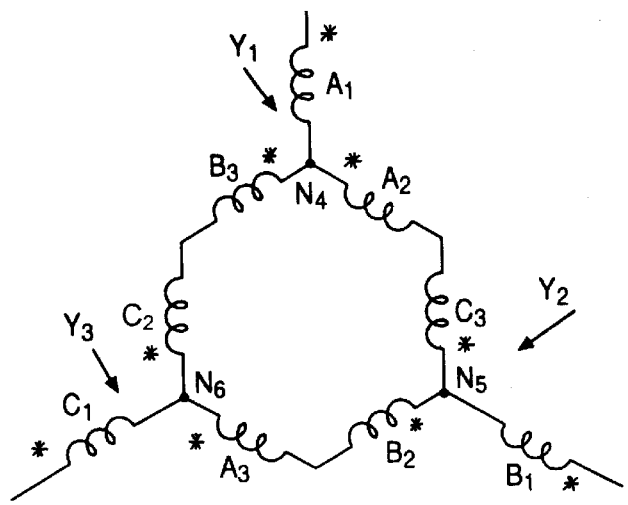
FIG. 7 is a winding schematic of a second embodiment of the invention.

Referring now to FIG. 7, a third set of three-phase windings, $A_3$, $B_3$ and $C_3$, are used in addition to the first two sets of windings described above. In this embodiment, the three sets of windings are formed into three groupings $Y_1$, $Y_2$ and $Y_3$. Each of the groupings forms a wye configuration having a respective node $N_4$, $N_5$ and $N_6$. The first grouping $Y_1$ has windings $A_1$, $A_2$, $B_3$ coupled together at node $N_4$. The second grouping $Y_2$ has windings $B_1$, $B_2$ and $C_3$ coupled together at common node $N_5$. The third grouping of windings $Y_3$ has windings $C_1$, $C_2$ and $A_3$ coupled together at common node $N_6$.

In the first grouping $Y_1$, the polarities of windings $A_2$ and $B_3$ are positive toward node $N_4$. The positive polarity of winding $A_1$ is away from node $N_4$. In grouping $Y_2$, the positive polarities of windings $C_3$ and $B_2$ are toward node $N_5$. The positive polarity of winding $B_1$ is away from node $N_5$. In grouping $Y_3$, the positive polarities of windings $C_2$ and $A_3$ are toward node $N_6$. The polarity of winding $C_1$ is away from node $N_6$. In grouping $Y_1$, winding $A_1$ is coupled to the rectifier circuit. Winding $A_2$ is coupled to winding $C_3$ of grouping $Y_2$. Winding $B_3$ is coupled to winding $C_2$ of grouping $Y_3$. In grouping $Y_2$, winding $B_1$ is coupled to the rectifier circuit. Winding $B_2$ is coupled to winding $A_3$ of grouping $Y_3$. In grouping $Y_3$, winding $C_1$ is coupled to the rectifier circuit.

Figure 8:
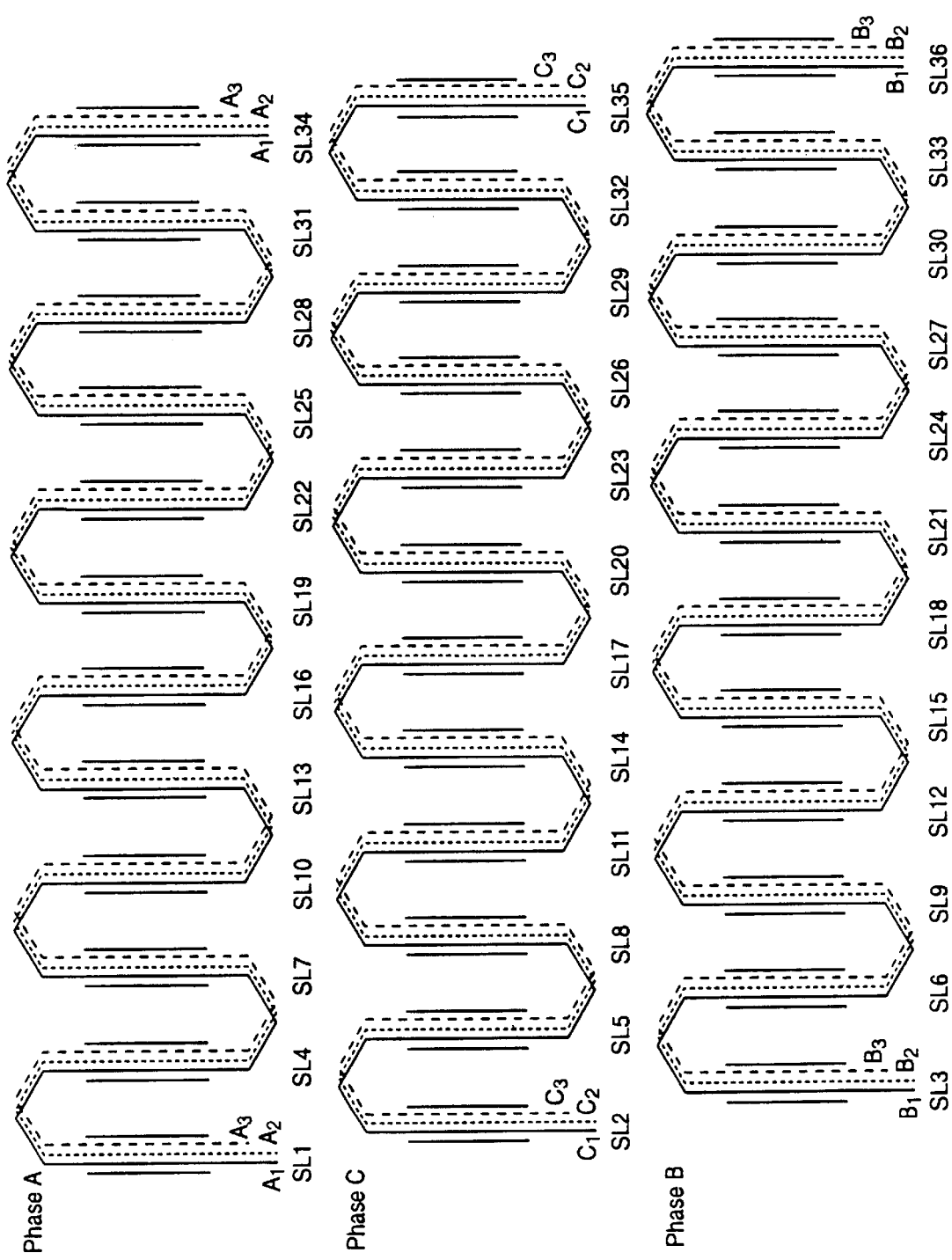
FIG. 8 is a winding diagram of the embodiment of FIG. 7.

Referring now to FIG. 8, a plot similar to that shown in FIG. 6 is illustrated wherein phase A, phase C and phase B are formed of the same slots of FIG. 6. In the embodiment however, winding $A_3$, $C_3$ and $B_3$ are disposed within the slots of phase A, phase C and phase B, respectively. In this embodiment, the positive polarities of windings $A_1$, $A_2$, and $A_3$ are toward slot 1, in phase C, windings $C_1$, $C_2$, and $C_3$ are toward slot 35, and the polarities of windings $B_1$, $B_2$, and $B_3$ of phase B are toward slot 3.

Figure 9:
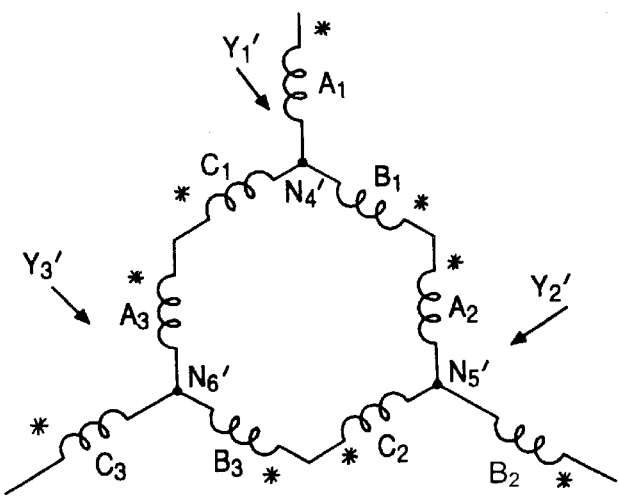
FIG. 9 is a schematic view of a third embodiment of the present invention.

Referring now to FIG. 9, a similar schematic to that of FIG. 7 is illustrated with the windings of the groupings changed. The groupings are primed to illustrate the change. In this configuration, grouping $Y_1'$ consists of winding $A_1$, $B_1$, and $C_1$ coupled together at common node $N_4'$. Grouping $Y_2'$ consists of winding $A_2$, $B_2$, and $C_2$ coupled together at common node $N_5'$. Grouping $Y_3'$ consists of winding $A_3$, $C_3$ and $B_3$ coupled together at common node $N_6'$. Windings $A_1$, $B_2$, and $C_3$ are coupled to the rectifier circuit and have the positive polarity toward the rectifier circuit. Winding $B_1$ is coupled to winding $A_2$, winding $C_1$ is coupled to winding $A_3$, the polarity of winding $B_1$ is away from node $N_4'$ and the polarity of winding $C_1$ is away from node $N_4'$. Winding $C_2$ is coupled to winding $B_3$. The polarities of windings $C_2$ and $B_3$ are away from nodes $N_5'$ and $N_6'$, respectively. The polarities of windings $A_2$ and $A_3$ are away from nodes $N_5'$ and $N_6'$, respectively.

Figure 10:
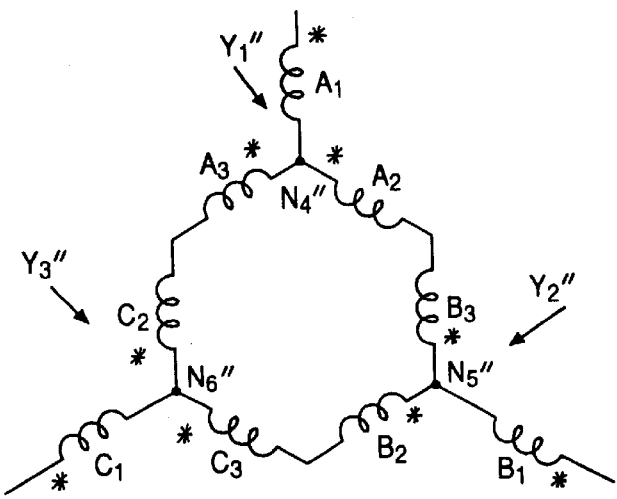
FIG. 10 is a schematic view of a fourth embodiment of the present invention.

Referring now to FIG. 10, a similar configuration to that shown in FIGS. 7 and 9 is illustrated. In this configuration, the first grouping $Y_3''$ consists of windings $A_2$, $A_2$, and $A_3$. The second grouping $Y_2''$ consists of windings $B_1$, $B_2$, and $B_3$. Grouping $Y_3''$ consists of windings $C_1$, $C_2$, and $C_3$. Each of the groups of windings has a common node $N_4''$, $N_5''$, and $N_6''$, respectively. Windings $A_1$, $B_1$, and $C_1$ have the positive polarities toward the rectifier circuit and away from the common nodes. Winding $A_2$ is coupled to winding $B_3$. Winding $A_3$ is coupled to winding $C_2$, winding $B_2$ is coupled to winding $C_3$. The polarity of windings $A_2$, $A_3$, $B_2$, $B_3$, $C_2$ and $C_3$ are positive toward their respective common nodes.

Figure 11:
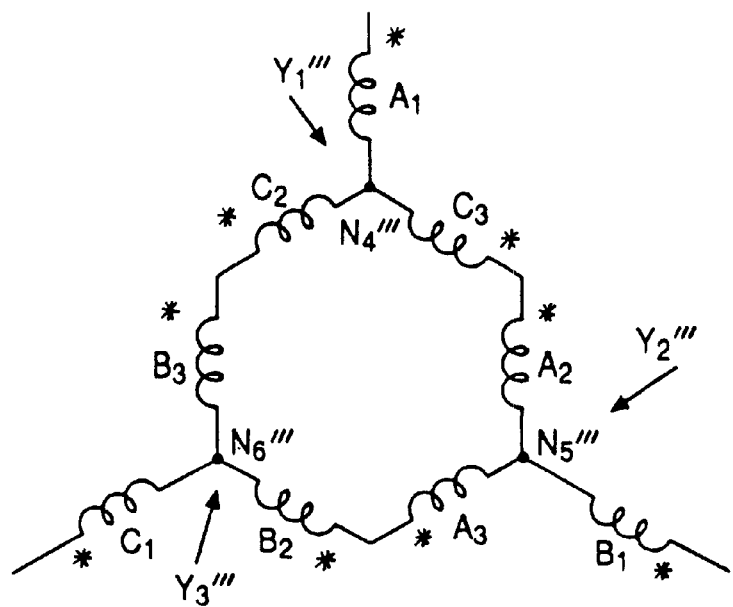
FIG. 11 is a schematic view of a fifth embodiment of the present invention.

Referring now to FIG. 11, yet another embodiment similar to FIGS. 7, 9 and 10 is illustrated. In this embodiment, grouping $Y_1'''$ consists of winding $A_1$, $C_2$ and $C_3$. Grouping $Y_2'''$ consists of windings $B_1$, $A_2$ and $A_3$. Grouping $Y_3'''$ consists of windings $C_1$, $B_2$ and $B_3$. Each of the groupings has a common node respectively $N_4'''$, $N_5'''$, and $N_6'''$. Windings $A_1$, $B_1$ and $C_1$ are coupled to the rectifier circuit and have the positive polarity toward the rectifier circuit. Winding $C_3$ is coupled to winding $A_2$. Winding $C_2$ is coupled to winding $B_3$. Winding $A_3$ is coupled to winding $B_2$. The polarities of windings $C_2$, $C_3$, $A_2$, $A_3$, $B_2$, and $B_3$ are away from their respective common nodes $N_4'''$, $N_5'''$, and $N_6'''$ respectively.

Figure 12:
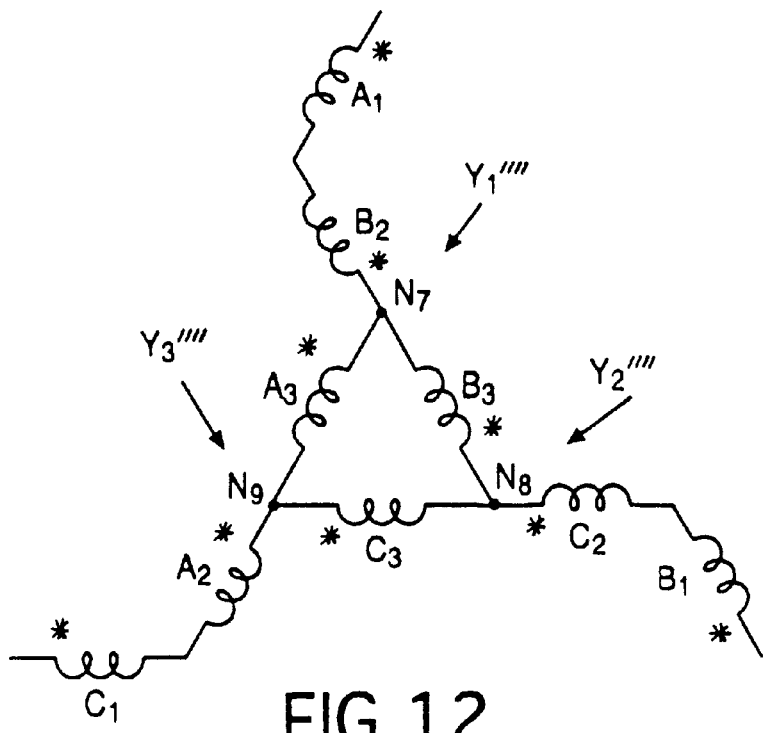
FIG. 12 is a schematic view of a sixth embodiment of the present invention.

Referring now to FIG. 12, a sixth embodiment of the present invention is illustrated. In this embodiment, three sets of three-phase windings are used similar to those and commonly labeled as those from FIGS. 7, 9, 10, and 11. In this embodiment, three wye groupings are formed. In the first grouping, windings $A_3$, $B_2$, and $B_3$ have a common node $N_7$ there-between. In the second grouping, windings $B_3$, $C_2$, and $C_3$ have a common node $N_8$ therebetween. In the third grouping, windings $A_2$, $A_3$, and $C_3$ have a common node $N_9$ therebetween. The positive polarity of winding $A_3$ is toward node $N_7$. The positive polarity of winding $B_3$ is toward node $N_8$ and the positive polarity of winding $C_3$ is toward node $N_9$. Node $N_7$ is coupled to the series combination of winding $A_1$ and $B_2$ where winding $A_1$ is coupled to the rectifier circuit and has a positive polarity theretoward and winding $B_2$ is coupled to node $N_7$ and has the positive polarity toward node $N_7$. Node $N_8$ has a series combination of windings $C_2$ and $B_1$ coupled thereto where winding $B_1$ is coupled to the rectifier circuit and has a positive polarity theretoward. Winding $C_2$ has a positive polarity coupled adjacent to node $N_8$. Node $N_9$ has a series combination of winding $A_2$ and $C_1$, coupled thereto where winding $C_1$ is coupled to the rectifier circuit and has the positive polarity theretoward. Winding $A_2$ is coupled to node $N_9$ with the positive polarity toward node $N_9$.

It can also be said that the windings $A_3$, $B_3$ and C3 form a delta connection wherein the positive polarities of winding $A_2$, $B_2$ and $C_2$ are connected to the negative polarity ends of windings $A_3$, $B_3$ and $C_3$ while the negative polarity ends of windings $A_2$, $B_2$ and $C_2$ are connected to the negative polarity ends of windings $A_1$, $B_1$ and $C_1$ The positive polarity ends of windings $A_1$, $B_1$ and $C_1$ are connected to the rectifier.

Figure 13:
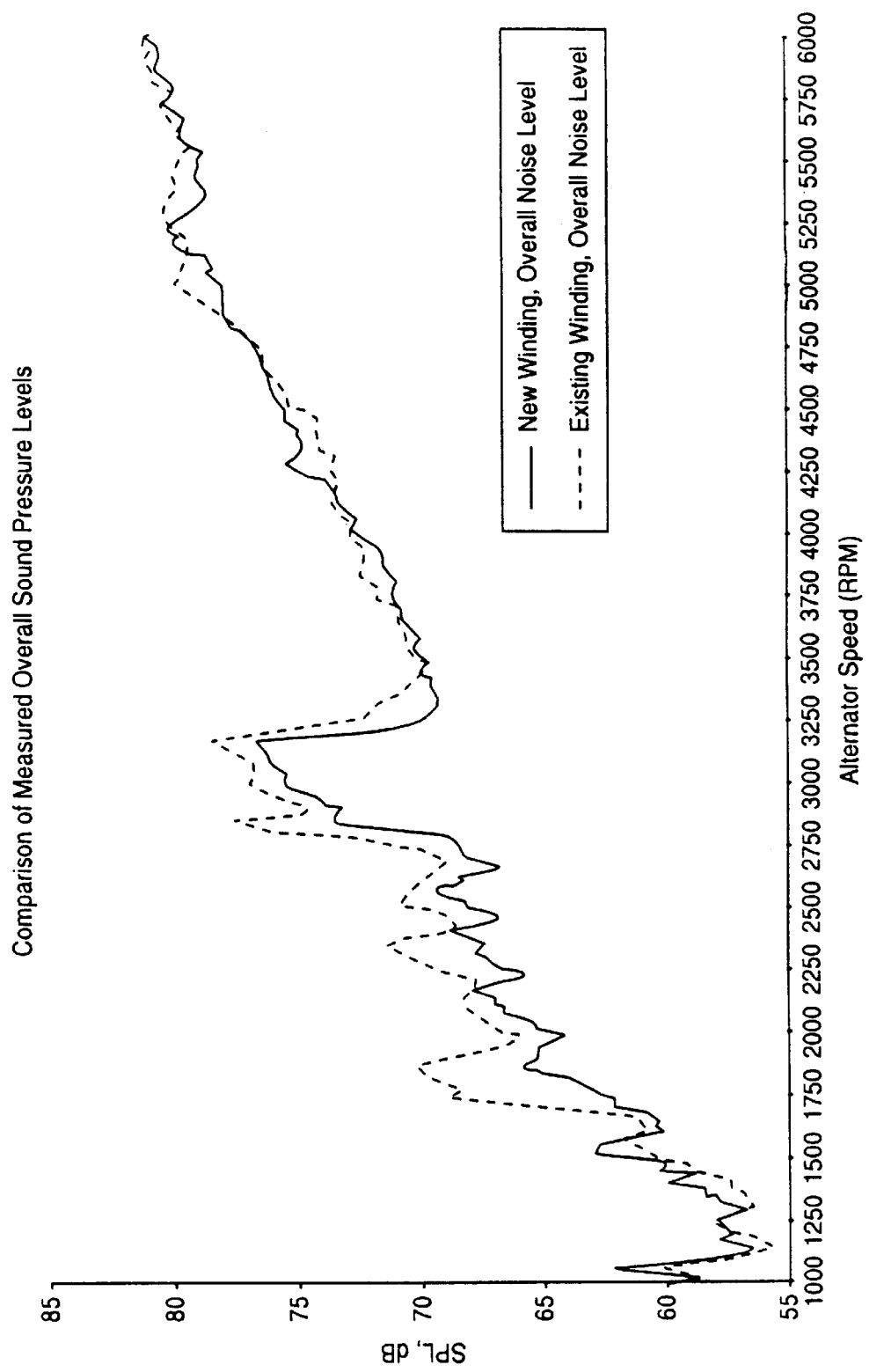
FIG. 13 is a plot of noise versus speed of a winding according to the present invention compared to existing windings.

Referring now to FIG. 13, the sound pressure levels of the new winding configuration shown in FIG. 5 is illustrated with respect to an existing winding. As can be seen, the overall sound pressure levels are lower in a winding configuration according to the present invention.

Figure 14:
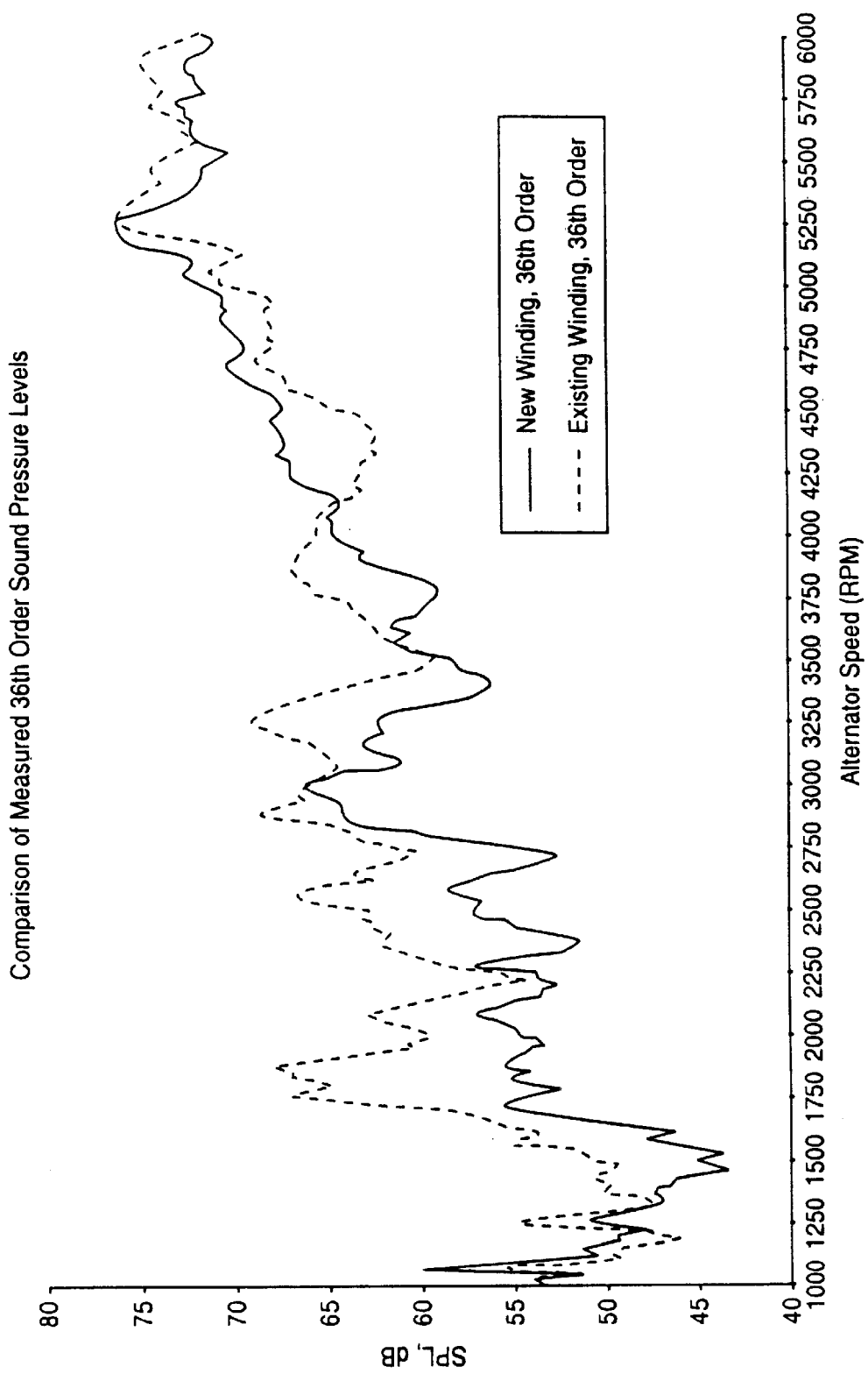
FIG. 14 is a plot of sound level versus speed for the 36th order sound pressure of an alternator according to the present invention compared to existing alternator.

Referring now to FIG. 14, the $36^{th}$ order sound pressure levels of a winding according to the present invention is shown in comparison to an existing winding. As is illustrated, a significant reduction in the sound pressure level of the 36 order sound is illustrated.

While particular embodiments of the invention have been shown and described, numerous variations and alternate embodiments will occur to those skilled in the art. Accordingly, it is intended that the invention be limited only in terms of the appended claims.

What is claimed:

1. An electrical machine comprising:

a stator core having a first plurality of slots, a second plurality of slots and a third plurality of slots;

a first set of three phase windings having a first winding, a second winding and a third winding;

a second set of three phase windings having a first winding, a second winding and a third winding;

a third set of three phase windings having a first winding, a second winding and a third winding;

said first winding of said first set, said first winding of said second set and said first winding of said third set disposed in said first plurality of slots;

said second winding of said first set, said second winding of said second set and said second winding of said third set disposed in said second plurality of slots:

said third winding of said first set, said third winding of said second set and said third winding of said third set disposed in said third plurality of slots;

said first set, said second set and said third set of windings being grouped into a first wye, a second wye and a third wye, said first wye electrically coupled to said second wye and said third wye, said second wye electrically coupled to said third wye;

wherein said first wye consists of said first winding of said first set, said first winding of said second set and said second winding of said third set, said first wye having a first common node therebetween;

said second wye consists of said third winding of said third set, said second winding of said first set and said second winding of said second set, said second wye having a second common node therebetween;

said third wye consists of said first winding of said third set, said third winding of said first set and said third winding of said second set, said third wye having a third common node therebetween.

2. An electrical machine comprising:

a stator core having a first plurality of slots, a second plurality of slots and a third plurality of slots;

a first set of three phase windings having a first winding, a second winding and a third winding;

a second set of three phase windings having a first winding, a second winding and a third winding;

a third set of three phase windings having a first winding, a second winding and a third winding;

said first winding of said first set, said first winding of said second set and said first winding of said third set disposed in said first plurality of slots;

said second winding of said first set, said second winding of said second set and said second winding of said third set disposed in said second plurality of slots;

said third winding of said first set, said third winding of said second set and said third winding of said third set disposed in said third plurality of slots;

said first set, said second set and said third set of windings being grouped into a first wye, a second wye and a third wye, said first wye electrically coupled to said second wye and said third wye, said second wye electrically coupled to said third wye;

wherein said first wye consists of said first winding of said first set, said second winding of said first set and said third winding of said first set, said first wye having a first common node therebetween;

said second wye consists of said first winding of said second set, said second winding of said second set and said third winding of said second set, said second wye having a second common node therebetween;

said third wye consists of said first winding of said third set, said second winding of said third set and said third winding of said third set, said third wye having a third common node therebetween;

wherein the third winding of the first set is coupled in series with the third winding of the first set; the second winding of the first set is coupled in series with the first winding of the second set; and the third winding of the second set is coupled in series with the second winding of the third set.

3. An electrical machine comprising:

a stator core having a first plurality of slots, a second plurality of slots and a third plurality of slots;

a first set of three phase windings having a first winding, a second winding and a third winding;

a second set of three phase windings having a first winding, a second winding and a third winding;

a third set of three phase windings having a first winding, a second winding and a third winding;

said first winding of said first set, said first winding of said second set and said first winding of said third set disposed in said first plurality of slots;

said second winding of said first set, said second winding of said second set and said second winding of said third set disposed in said second plurality of slots;

said third winding of said first set, said third winding of said second set and said third winding of said third set disposed in said third plurality of slots;

said first set, said second set and said third set of windings being grouped into a first wye, a second wye and a third wye, said first wye electrically coupled to said second wye and said third wye, said second wye electrically coupled to said third wye;

wherein said first wye consists of said first winding of said first set, said first winding of said second set and said third winding of said third set, said first wye having a first common node therebetween;

said second wye consists of said second winding of said first set, said second winding of said second set and said second winding of said third set, said second wye having a second common node therebetween;

said third wye consists of said third winding of said first set, said third winding of said second set and said second winding of said third set, said third wye having a third common node therebetween.

4. An electrical machine comprising:

a stator core having a first plurality of slots, a second plurality of slots and a third plurality of slots;

a first set of three phase windings having a first winding, a second winding and a third winding;

a second set of three phase windings having a first winding, a second winding and a third winding;

a third set of three phase windings having a first winding, a second winding and a third winding;

said first winding of said first set, said first winding of said second set and said first winding of said third set disposed in said first plurality of slots;

said second winding of said first set, said second winding of said second set and said second winding of said third set disposed in said second plurality of slots;

said third winding of said first set, said third winding of said second set and said third winding of said third set disposed in said third plurality of slots;

said first set, said second set and said third set of windings being grouped into a first wye, a second wye and a third wye, said first wye electrically coupled to said second wye and said third wye, said second wye electrically coupled to said third wye;

wherein said first wye consists of said first winding of said first set, said third winding of said second set and said third winding of said third set, said first wye having a first common node therebetween;

said second wye consists of said second winding of said first set, said first winding of said second set and said first winding of said third set, said second wye having a second common node therebetween;

said third wye consists of said third winding of said first set, said second winding of said second set and said second winding of said third set, said third wye having a third common node therebetween.

5. An electrical machine comprising:

a stator core having a first plurality of slots, a second plurality of slots and a third plurality of slots;

a first set of three phase windings having a first winding, a second winding and a third winding;

a second set of three phase windings having a first winding, a second winding and a third winding;

a third set of three phase windings having a first winding, a second winding and a third winding;

said first winding of said first set, said first winding of said second set and said first winding of said third set disposed in said first plurality of slots;

said second winding of said first set, said second winding of said second set and said second winding of said third set disposed in said second plurality of slots;

said third winding of said first set, said third winding of said second set and said third winding of said third set disposed in said third plurality of slots;

said first set, said second set and said third set of windings being grouped into a first wye, a second wye and a third wye, said first wye electrically coupled to said second wye and said third wye, said second wye electrically coupled to said third wye;

wherein said first wye consists of said second winding of said second set, said second winding of said third set and said first winding of said third set, said first wye having a first common node therebetween;

said second wye consists of said second winding of said third set, said third winding of said second set and said third winding of said third set, said second wye having a second common node therebetween;

said third wye consists of said third winding of said third set, said first winding of said second set and said first winding of said third set, said third wye having a third common node therebetween.

6. An electrical machine as recited in claim 5 wherein said first winding of said first set is coupled in series with said second winding of said second set, said second winding of said first set is coupled in series with said third winding of said second set, and said third winding of said first set is coupled in series with said first winding of said second set.

* * * * *